United States Patent
Sharma

(10) Patent No.: US 10,523,581 B2
(45) Date of Patent: Dec. 31, 2019

(54) FLIGHTING OF NODE CONTROLLER IN PILOT MODE IN RESOURCE MANAGEMENT SYSTEM

(71) Applicant: Microsoft Technology Licensing, LLC, Redmond, WA (US)

(72) Inventor: Atri Sharma, Bangalore (IN)

(73) Assignee: Microsoft Technology Licensing LLC, Redmond, WA (US)

( * ) Notice: Subject to any disclaimer, the term of this patent is extended or adjusted under 35 U.S.C. 154(b) by 338 days.

(21) Appl. No.: 15/404,070

(22) Filed: Jan. 11, 2017

(65) Prior Publication Data

US 2018/0123863 A1    May 3, 2018

Related U.S. Application Data

(60) Provisional application No. 62/495,589, filed on Oct. 31, 2016.

(51) Int. Cl.
    *H04L 12/911*     (2013.01)
    *H04L 12/24*     (2006.01)

(52) U.S. Cl.
    CPC ............ *H04L 47/70* (2013.01); *H04L 41/082* (2013.01); *H04L 41/5009* (2013.01); *H04L 41/0859* (2013.01)

(58) Field of Classification Search
    CPC ... H04L 47/70; H04L 41/082; H04L 41/5009; H04L 41/0859
    USPC ........................................................ 709/202
    See application file for complete search history.

(56) References Cited

U.S. PATENT DOCUMENTS

| 7,814,491 | B1 | 10/2010 | Chen et al. |
| 7,848,834 | B2 * | 12/2010 | Tecco ...................... H04L 29/06 700/97 |
| 8,595,331 | B2 | 11/2013 | Henseler et al. |
| 8,849,891 | B1 | 9/2014 | Suchter et al. |

(Continued)

FOREIGN PATENT DOCUMENTS

CN      104618164 A      5/2015

OTHER PUBLICATIONS

Linthicum, David, "Getting to zero downtime: How containers drive continuous operations", Published on: Sep. 16, 2015, Available at: http://techbeacon.com/getting-zero-downtime-how-containers-drive-continuous-operations (Year: 2015).*

(Continued)

*Primary Examiner* — Sm A Rahman
*Assistant Examiner* — Chen-Liang Huang
(74) *Attorney, Agent, or Firm* — Fiala & Weaver P.L.L.C.

(57) ABSTRACT

Implementing a new node controller in a cluster environment. A method includes, at a primary node controller in the cluster environment, deploying a secondary node controller to be updated, associated with a flight container. The secondary node controller appears logically to the primary node controller as resources available to the primary node controller to which the primary node controller can assign cluster jobs. The primary node controller delegates cluster jobs to the secondary node controller. Sub-containers are started in the flight container for the secondary node controller to start delegated cluster jobs. Performance of the secondary node controller is monitored with respect to the started jobs.

24 Claims, 3 Drawing Sheets

(56) References Cited

U.S. PATENT DOCUMENTS

| | | | |
|---|---|---|---|
| 8,942,727 B1* | 1/2015 | Roman | H04L 67/18 |
| | | | 455/456.1 |
| 9,128,766 B1* | 9/2015 | Herington | G06F 1/3203 |
| 9,256,467 B1 | 2/2016 | Singh et al. | |
| 9,300,728 B1 | 3/2016 | Ananchaperumal | |
| 9,336,063 B1* | 5/2016 | Kempe | G06F 9/5083 |
| 9,787,639 B1* | 10/2017 | Sun | H04L 63/0245 |
| 2014/0379921 A1 | 12/2014 | Morley et al. | |
| 2016/0019053 A1 | 1/2016 | Gambardella et al. | |
| 2016/0173572 A1 | 6/2016 | Chan et al. | |
| 2017/0090779 A1* | 3/2017 | Barzik | G06F 3/067 |
| 2017/0293762 A1* | 10/2017 | Karhunen | G06F 9/547 |
| 2018/0081664 A1* | 3/2018 | Sagiraju | G06F 8/63 |

OTHER PUBLICATIONS

Ryza, Sandy, "Apache Spark Resource Management and YARN App Models", Published on: May 30, 2014 Available at: http://blog.cloudera.com/blog/2014/05/apache-spark-resource-management-and-yarn-app-models/.

Lin, et al., "Flighting deployment (beta testing) in Azure App Service", Published on: Feb. 2, 2016 Available at: https://azure.microsoft.com/en-in/documentation/articles/app-service-web-test-in-production-controlled-test-flight/.

Linthicum, David, "Getting to zero downtime: How containers drive continuous operations", Published on: Sep. 16, 2015 Available at: http://techbeacon.com/getting-zero-downtime-how-containers-drive-continuous-operations.

Bhasha, Chand, "Flighting feature in SAP frequest releases", Published on: Jul. 15, 2016 Available at: http://scn.sap.com/thread/3932232.

Ryza, Sandy, "Migrating to MapReduce 2 on YARN (For Operators)", Published on: Nov. 7, 2013 Available at: http://blog.cloudera.com/blog/2013/11/migrating-to-mapreduce-2-on-yarn-for-operators/.

Lin, et al., "Job Dispatching and Scheduling for Heterogeneous Clusters—A Case Study on the Billing Subsystem of CHT Telecommunication", In IEEE 39th Annual International Computers, Software & Applications Conference, Jul. 1, 2015, pp. 748-757.

* cited by examiner

FLIGHTING OF NODE CONTROLLER IN PILOT MODE IN RESOURCE MANAGEMENT SYSTEM

This application claims priority to U.S. Provisional Patent Application No. 62/495,589, filed Oct. 31, 2016, and entitled "FLIGHTING OF NODE CONTROLLER IN PILOT MODE IN RESOURCE MANAGEMENT SYSTEM" (originally filed as U.S. patent application Ser. No. 15/339,566 for which a "Petition Under 37 C.F.R. § 1.53(b) to Convert Non-Provisional Application to Provisional Application" was filed Nov. 16, 2016), the disclosure of which is incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Interconnection of computing systems has facilitated distributed computing systems, such as clustered computing systems. In this description, clustered computing systems may be systems or resources for enabling near-ubiquitous, convenient, on-demand network access to a shared pool of configurable computing resources (e.g., networks, servers, storage, applications, services, etc.) that can be provisioned and released with reduced management effort or service provider interaction.

Such cluster systems typically have node controllers that controls how various how jobs are allocated on nodes of the cluster for processing. As with nearly all computer hardware and software components, node controller technology advances such that it is often desirable to update a node in a cluster system with a new node controller. However, any time a new component, such as a new node controller, is installed in a production environment, there are risks that the component will have certain deficiencies that have not been fully accounted for, even when extensive testing has been completed on the component. A node controller failing in the production environment can impact nodes or even disable the entire cluster. Additionally, switching to a new node controller may require some down time as the old node controller is decommissioned, and the new node controller is activated.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a computer implemented method for deploying a secondary node controller in a cluster environment. The method includes, at a primary node controller in the cluster environment, deploying a secondary node controller to be updated, associated with a flight container. The secondary node controller appear logically to the primary node controller as resources available to the primary node controller to which the primary node controller can assign cluster jobs. The primary node controller delegates cluster jobs to the secondary node controller. Sub-containers are started in the flight container for the secondary node controller to start delegated cluster jobs. Performance of the secondary node controller is monitored with respect to the started jobs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
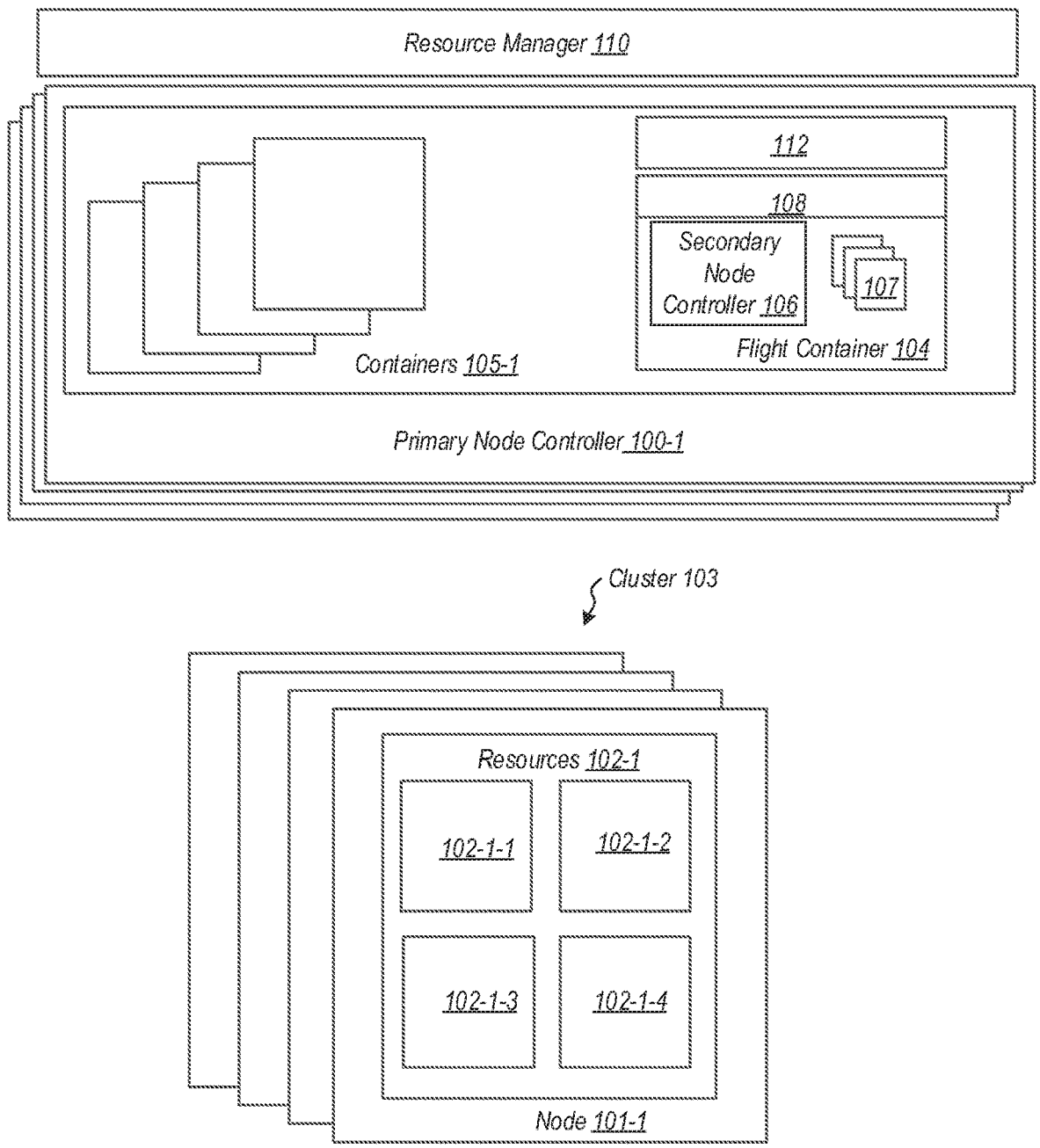
FIG. 1 illustrates a node controller including a flight container for deploying new node controllers.

One embodiment illustrated herein includes a primary node controller that instantiates a flight container, or that includes functionality to implement a flight container. As used herein, a container is a running process entity which includes a resources allocation and logical connections from a node controller to the resource allocation. Cluster jobs can be assigned to the container for execution under the control of the node controller.

A flight container is a special type of container, which is a running process entity which is associated with a resource allocation and logical connections from a primary node controller as well as logical connections to a secondary node controller, thus logically connecting the resource allocation to both the primary node controller and the secondary node controller. Cluster jobs can be assigned to the flight container for execution under control of the secondary node controller. However, as the primary node controller views the flight container as having a resource allocation for the primary node controller, similar to other containers, control of job execution can be superseded by the primary node controller.

The flight container allows a secondary node controller to be "plugged into" the primary node controller and presented to the primary node controller as simply part of the resource allocation of the flight container, among other resources, allocated to the primary node controller. In this way, a secondary node controller can be deployed to a production environment appearing as part of a set of resources available to the primary node controller. The primary node controller can use the secondary node controller with the flight container, as it uses other resources in other containers available to it, to allocate various resources and jobs to nodes in a cluster, as well as performing jobs at the primary node controller itself. As with other resources available to the primary node controller, if the secondary node controller does not perform as expected, or fails outright, other containers and associated resources can be accessed to perform the jobs previously assigned to the secondary node controller. In particular, the primary node controller can assign node jobs to other containers.

Additionally, the primary node controller can monitor the flight container to gather performance data to determine how well the secondary node controller is operating. This information can be provided to application developers and system administrators who can then evaluate the secondary node controller to determine its readiness for installation in a production environment as a primary node controller. In this way, a secondary node controller can be deployed to a production environment in real time, and/or with zero-downtime for swapping and or upgrading the node controller. Additional details are now illustrated.

Embodiments can allow for flighting of new secondary node controllers "inside" an already tested primary node controller. The primary node controller handles the actual resource management but can use the secondary node controller for the low level node controller functionality. In some embodiments, the secondary node controller can be caused to go through multiple cycles of pilot testing until it is deemed to be stable and able to be deployed as a primary node controller.

Node controller flighting can allow for quicker and more widespread adoption of newer versions of node controller in production systems and allows for rapid upgrades to quickly implement more advanced cluster systems with improved resource management. Indeed, some embodiments can deploy a secondary node controller without needing to bring down the previous node controller as the secondary node controller can simply be added and associated with, such as by connecting logically to, a container of the previous node controller. As illustrated below, the previous node controller is illustrated as a primary node controller 100-1.

Referring now to FIG. 1, an example is illustrated. FIG. 1 illustrates a primary node controller 100-1 which controls a node (e.g., node 101-1) in a cluster 103 including a set of cluster nodes. In particular, there is one node controller per node in the set of cluster nodes. The primary node controller 100-1 can access a set of resources on a node, such as resources 102-1-1 on node 101-1 that can be invoked to perform cluster jobs. In particular, resources on nodes are accessed through containers. As noted above, a container is a process associated with resources allocation and logical connections from a node controller to the resource allocation. Cluster jobs can be assigned to the container for execution under the control of the node controller. Thus, FIG. 1 illustrates a set of containers 105-1. Cluster jobs are assigned to a particular node controller by the resource manager 110. The node controller can assign jobs to containers. Note that the resource manager 110 and node controllers are typically implemented on hardware at nodes in the cluster. Nodes may be hardware computing systems implemented in the cluster 103.

In particular, a client of a cluster can submit computing jobs to the resource manager 110. The resource manager 110 can contact a node controller for a node, such as node controller 100-1 for node 101-1 and assign computing jobs to the node controller 100-1 to be performed at the node 101-1 associated with the node controller 100-1. The jobs are assigned to one or more containers in the containers 105-1.

Within the set of containers 105-1 for the primary node controller 100-1, is a flight container 104. The flight container 104 container is a special type of container, which is running process associated with a resource allocation and logical connections from a primary node controller as well as logical connections to a secondary node controller, thus logically connecting the resource allocation to both the primary node controller and the secondary node controller. Cluster jobs can be assigned to the flight container for execution under control of the secondary node controller. However, as the primary node controller views the flight container as a resource allocation similar to other containers, control of job execution can be superseded by the primary node controller. Thus, in the illustrated example, the flight container 104 may be logically connected to the secondary node controller 106 as well as the primary node controller 110-1. The flight container 104 and secondary node controller 106 will logically appear to the primary node controller 100-1 as resources available to the primary node controller 100-1 to which the primary node controller 100-1 can assign cluster jobs. Notably, the set of resources 102-1 may include compute resources 102-1-1 (such as processor cycles), memory resources 102-1-2, storage resources 102-1-3, and other resources 102-1-4. As will be described later, portions of each of these resources can be allocated to containers, including the flight container 104 under control of the secondary node controller 106.

In the illustrated example, the flight container 104 includes a container command proxy 108. The container command proxy 108 includes interface elements which the primary node controller 100-1 can use to direct commands and resource requests to the secondary node controller 106 in the flight container 104 such that the secondary node controller 106 is viewed as a part of the set of resources 102-1 available to the primary node controller 100-1.

Figure 2:
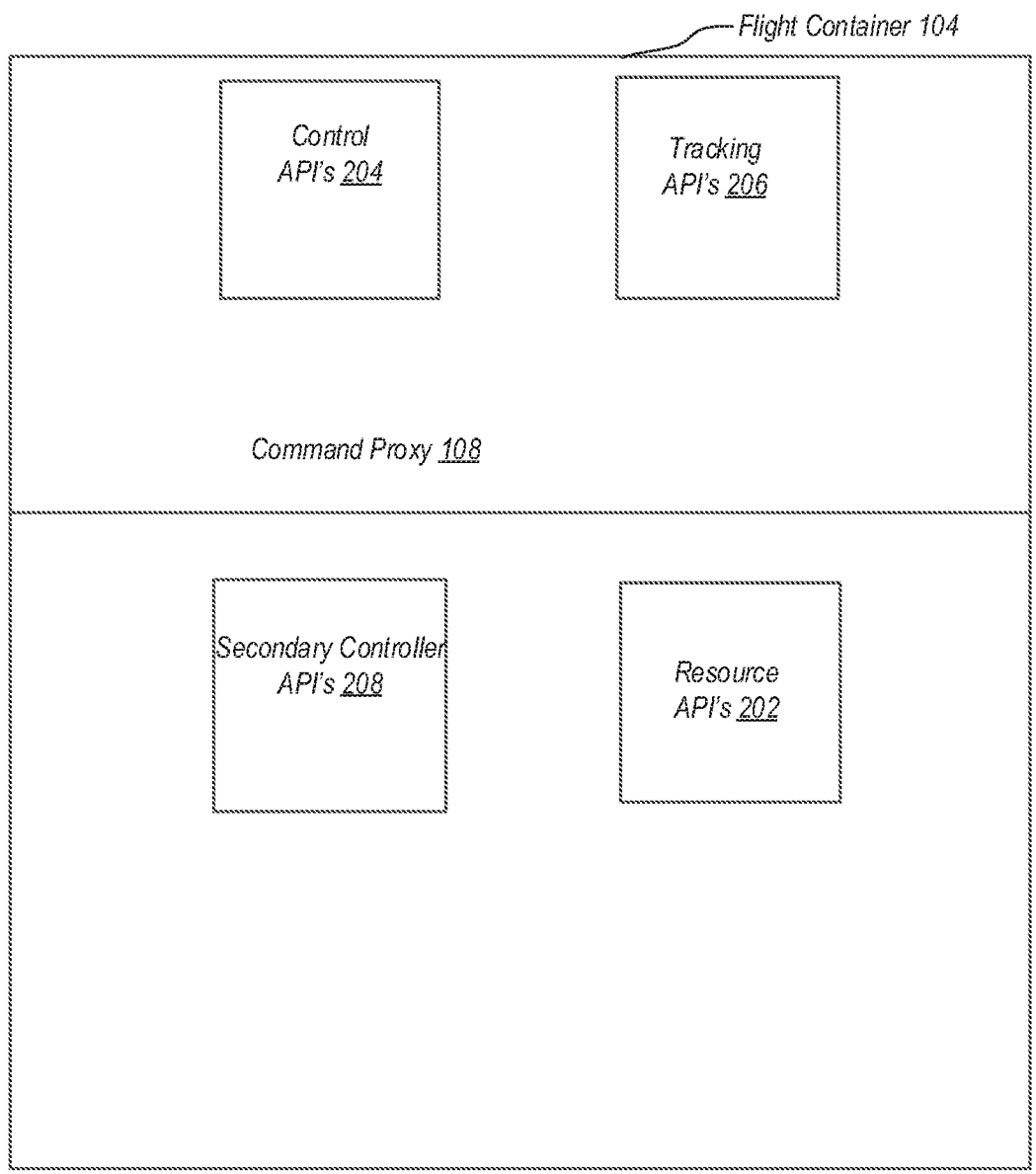
FIG. 2 illustrates additional details for a flight container.

Illustrating now additional details with reference to FIG. 2, the flight container 104 is a running process and logically defined container which allows node cluster jobs to be executed associated with the flight container 104. The flight container 104 can have resources allocated to it. In particular, the flight container 104 may include a set of resource Application Programming Interfaces (APIs) 202. These resource APIs include programming controls that allow the flight container 104 to be assigned portions of each of the resources 102-1-1 through 102-1-4. Additionally, using these APIs, the flight container 104 can access the portions of the resources to utilize the resources for performing node cluster jobs.

The flight container 104 further includes specialized features which allows another node controller, e.g., the primary node controller 100-1, to take over the control of the flight container jobs. This allows the primary node controller 100-1 to take over in case of a failure of the secondary node controller 106 (see FIG. 1). For example, FIG. 2 illustrates that the command proxy 108 includes control APIs 204. The control APIs include interface elements which the primary node controller 100-1 can use to assume control of any jobs being performed by a secondary node controller implemented in the flight container.

Additionally, the flight container 104 includes a feature which allows external controllers to track the success or failure progress of the node cluster jobs being performed at the flight container 104 by secondary node controllers. This can be used by external controllers (such as the primary node controller 100-1) to determine if the primary node controller 100-1 needs to assume responsibility for node cluster jobs being performed at the flight container 104. Alternatively, this may be used simply for reporting and logging of secondary node controller performance. As illustrated in FIG. 2, the command proxy 108 may include tracking APIs 206 obtain information about secondary node controllers running in the flight container 104.

Note that FIG. 2 further illustrates Secondary Controller APIs 208 in the flight container 104. These are used as interfaces between a secondary node controller 106 (see FIG. 1) and the flight container 104 to deploy the secondary node controller 106 and associate the secondary node controller 106 with the flight container 104. Note that while shown directly in the flight container 104, these APIs may be included in the command proxy 108 or in other locations.

Note that the APIs illustrated herein may be implemented by a hardware processor executing executable code to instantiate various logical elements.

The following now illustrates various details with respect to components of some embodiments of the invention as illustrated herein.

As noted above, the flight container 104 may include a container command proxy 108. This is a special container command proxy which allows sending of node controller commands from the primary node controller 100-1 to the secondary node controller 106. In some embodiments, this can only be allocated in the primary node controller 100-1 with special administrative privileges.

FIG. 1 further illustrates that the primary node controller 100-1 includes a flight container 104. The flight container 104 is a special type of container which can run with an instance of a new version of a node controller, such as the secondary node controller 106. The flight container 104 has special access so that the secondary node controller 106 can create sub-containers 107 inside the flight container 104 and allocate resources which it has been allocated to sub-containers.

Note that the primary node controller 100-1 can force the secondary node controller 106 to relinquish control of any jobs and take control back for those jobs if the secondary node controller 106 fails or is not functioning properly in the production environment. The primary node controller 100-1 can assign reclaimed jobs to another container in the containers 105-1. Further, the primary node controller 100-1 has authority to supersede the secondary node controller's node management decisions. This can be accomplished, for example, using interfaces in the control API's 204.

The following illustrates actions that can be taken for some embodiments of the invention.

The primary node controller 100-1 starts a flight container 104. Starting a flight container may include allocating certain resources from the resources 102-1-1 through 102-1-4 to the flight container 104. For example, starting a flight container 104 may include allocating a number of processors and/or processor time, memory resources, storage resources, network resources, and the like. In particular, the flight container will have some resources allotted to it, for e.g., memory, CPU percentage, I/O percentage etc. In addition, it will have an API to control its underlying container, and an API to run a separate container inside itself, and an API, such as the control APIs 204 to allow a main controller (e.g., the primary controller 100-1) to take over any resources in the flight container 104.

The primary node controller 100-1 allocates a container command proxy 108 between itself and the allocated flight container 104. The command proxy 108 translates commands from the primary node controller 100-1 into commands for the secondary node controller 106 in a fashion that allows the secondary node controller 106 to function as if it were an independent node controller deployed to a production environment. Such commands may include commands to: determine child container performance, takeover from the secondary controller, allocate resources, etc.

The primary node controller 100-1 starts a secondary node controller 106 associated with the flight container 104. Note that, in some embodiments, only the primary node controller 100-1 can communicate with the secondary node controller 106 associated with flight container 104.

A number of jobs designated for the primary node controller 100-1 will be delegated to the secondary node controller 106 by the primary node controller 100-1 through the container command proxy 108 using the control APIs 204. This number of jobs may be specified, in some embodiments, in user settings. For example, a user may specify in a control user interface a number of jobs to be delegated to the secondary node controller 106. Alternatively or additionally, a user may specify a percentage of jobs being handled by the primary node controller 100-1 to be delegated to the secondary node controller 106. In some embodiments, default settings may specify the number or percent of jobs to be delegated to the secondary node controller 106. In some embodiments, all jobs for the primary node controller 100-1 may be sent to the secondary node controller 106. Indeed, in some embodiments, substantially all system resources 102-1-1 through 102-1-4 can be allocated to the flight container 104, and substantially all system jobs will be delegated to the secondary node controller 106 resulting in substantially an upgrade from the primary node controller 100-1 to the secondary node controller 106. In some embodiments, this can be a nested upgrade process so that still further secondary node controllers could be deployed in a flight container of the secondary node controller 106. De-nesting could be performed to simply have a single level of node controllers during other maintenance tasks.

The secondary node controller 106 will return unique IDs or process IDs to the primary node controller 100-1 for sub-containers started for the requested jobs.

The secondary node controller 106 will allocate some (or in some embodiments, substantially all) of its resources to at least one sub-container in the sub-containers 107 and run the requested jobs in the sub-container. For example, the secondary node controller 106 can allocate some of its compute resources, storage resources, memory resources, and/or networking resources to a sub-container to be able to perform a requested job. In particular, the secondary node controller 106 can treat the sub-containers in a fashion similar to how the containers 105-1 are treated by the primary node controller 100-1.

In some embodiments, the primary node controller 100-1 will periodically ping the secondary node controller 106 for the status of the running jobs given using the tracking APIs 206. The primary node controller can accomplish this functionality by sending a request to the secondary node controller 106, where the request includes the unique process ID and a directive to the secondary node controller to provide information related to the unique process ID. The primary node controller may request information about a length of time a process has been running. Alternatively or additionally, the primary node controller may request information about an amount of resources (e.g., compute, memory, storage and/or network resources) a process has been using. Alternatively or additionally, the primary node controller may request information about a number of errors, or rate of errors occurring related to the unique process ID.

In some embodiments, the primary node controller 100-1 can generate performance reports which can be viewed by system designers or system administrators. The reports can include information obtained by the primary node controller 100-1 from the secondary node controller 106, including time for processing, resources used, error rates, etc.

The secondary node controller 106 can be monitored to determine if it is meeting certain targets. If the secondary node controller 106 is not meeting the targets, the primary node controller can take over job processing using the control APIs 204. For example, if the job execution time exceeds a given limit, resource usage limit, or other limit, the primary node controller 100-1 can force the secondary node controller 106 to abort the running job and the primary node controller 100-1 can run the running job itself. In some embodiments, this can be used to accomplish a node controller roll-back. That is, embodiments could roll a node controller upgrade to the secondary node controller back to the primary node controller.

In some embodiments, instead of completely shutting down the secondary node controller 106 and removing all jobs from the secondary node controller 106, embodiments may temporarily shut down the secondary node controller 106 and make configuration changes to the secondary node controller 106 and then resume delegating jobs to the secondary node controller 106 through the flight container 104. For example, this can be done by allowing the flight container 104 and sub-containers 107 containers to keep running while shutting down the secondary node controller 106 to make any desired configuration changes to the secondary node controller 106. The secondary node controller 106 can be restarted and reassociated with the flight container 104 and sub-containers 107.

This can be accomplished as the containers poll on a given port and they expect a response from a node controller on that port. While configuration changes are being made in node controller, the primary node controller 100-1 can respond on that port. When secondary node controller resumes, it can resume responding.

Node controller state can be preserved to disk or other storage and both the primary node controller 100-1 and the secondary node controller 106 can read the state from disk or other storage and keep working and updating state to disk.

In some embodiments, where the secondary node controller 106 is being tested or when there is a gradual upgrade to the secondary node controller 106, the embodiments may include a filter 112 which prevents certain jobs or certain types of jobs from being sent to the secondary node controller 106. In particular, specific jobs can be set to not be sent to the secondary node controller 106 but rather be run in the primary node controller 100-1. For example, certain mission critical jobs may be designated as jobs that should be executed by the primary node controller 100-1 as opposed to a secondary node controller 106. For example, embodiments may designate any jobs that cannot be risked for a potential failure and restart should be run by the primary node controller 100-1 and should not be run in the secondary node controller 106. Note that in some embodiments, the filter 112 may be implemented as part of the command proxy 108. The command proxy could reject any jobs indicated by the filter 112 and notify the primary node controller 110-1 that the jobs cannot be performed by the flight container 104. Alternatively, the filter 112 may be used external to the command proxy 108. For example, the primary node controller 100-1 may be able to query the filter 112 for a job to determine if the job can be sent to the flight container 104.

In some embodiments, these filters may be time based filters and/or incremental filters. Thus, for example, over time, the number and/or types of jobs filtered away from the secondary node controller 106 may be reduced.

In some embodiments, the secondary node controller 106 is prevented from communicating directly with the resource manager 110 for the primary node controller 100-1. The resource manager 110 arbitrates cluster resources between different nodes and node controllers and thus helps to manage distributed applications. Rather, the secondary node controller 106 treats the primary node controller 100-1 as its resource manager. Resource requests that primary node controller 100-1 cannot service will be sent to the resource manager 110 by the primary node controller 100-1.

Some embodiments may include means for allocating system resources to a flight container in the node controller. For example, such means may include a processor 114 and computer readable storage medium 116 having computer executable instructions 118 stored thereon. In the examples illustrated herein, the processor 114 and computer readable storage medium may be part of resources on a node in the cluster 102. Alternatively or additionally, the means may include the processor executing the computer executable instructions to instantiate the flight container 104. Alternatively or additionally, the means may include the processor executing the computer executable instructions to instantiate the resource APIs 202. The means may further includes invoking the resource APIs 202 to logically couple system resources 102-1-1 through 102-1-4 to the flight container 104. Note that the means may alternatively or additionally include the use of System on Chip (SoC) systems, Application Specific Integrated Circuits (ASICs), virtual machines, or similar devices in conjunction with, or alternatively to the processor 114 and computer readable storage medium 116 having computer executable instructions 118 stored thereon. Note that the processor 114 and computer readable storage media 116 may be implemented on a cluster node or other hardware in the cluster 103.

Some embodiments may include means for deploying a secondary node controller to the flight container such that the secondary node controller appears logically to the node controller as resources available to the node controller to which the node controller can assign computing cluster jobs. For example, such means may include a processor 114 and computer readable storage medium 116 having computer executable instructions 118 stored thereon. Alternatively or additionally, the means may include the processor executing the computer executable instructions to instantiate the flight container 104. Alternatively or additionally, the means may include the processor executing the computer executable instructions to instantiate the updated controller APIs 206. The means may further includes invoking the updated controller APIs 206 to logically couple a secondary node controller 106 to the flight container 104. Note that the means may alternatively or additionally include the use of System on Chip (SoC) systems, Application Specific Integrated Circuits (ASICs), virtual machines or similar devices in conjunction with, or alternatively to the processor 114 and computer readable storage medium 116 having computer executable instructions 118 stored thereon.

Some embodiments may include means for controlling secondary node controllers deployed in the flight container.

For example, such means may include a processor 114 and computer readable storage medium 116 having computer executable instructions 118 stored thereon. Alternatively or additionally, the means may include the processor executing the computer executable instructions to instantiate the flight container 104. Alternatively or additionally, the means may include the processor executing the computer executable instructions to instantiate the control APIs 204. The means may further includes invoking the control APIs 204 to send and receive control information to and from the secondary node controller 106. Note that the means may alternatively or additionally include the use of System on Chip (SoC) systems, Application Specific Integrated Circuits (ASICs), virtual machines or similar devices in conjunction with, or alternatively to the processor 114 and computer readable storage medium 116 having computer executable instructions 118 stored thereon.

Some embodiments may include means for directing command and resource requests between the secondary node controller and the primary node controller. For example, such means may include a processor 114 and computer readable storage medium 116 having computer executable instructions 118 stored thereon. Alternatively or additionally, the means may include the processor executing the computer executable instructions to instantiate the flight container 104. Alternatively or additionally, the means may include the processor executing the computer executable instructions to instantiate the command proxy 108. The means may further includes invoking the command proxy 108 to send and receive resource requests to and from the secondary node controller 106. Note that the means may alternatively or additionally include the use of System on Chip (SoC) systems, Application Specific Integrated Circuits (ASICs), virtual machines or similar devices in conjunction with, or alternatively to the processor 114 and computer readable storage medium 116 having computer executable instructions 118 stored thereon.

Some embodiments may include means for filtering jobs from being delegated by the primary node controller to the secondary node controller based on job characteristics. For example, such means may include the filter 112. Alternatively or additionally, such means may include a processor 114 and computer readable storage medium 116 having computer executable instructions 118 stored thereon. Alternatively or additionally, the means may include the processor executing the computer executable instructions to instantiate the filter 112. Alternatively or additionally, the means may include the processor executing the computer executable instructions to invoke the filter by sending jobs to the filter. The means may further include the filter passing jobs to the flight container 104 and/or blocking jobs from being passed to the flight container 104. Note that the means may alternatively or additionally include the use of System on Chip (SoC) systems, Application Specific Integrated Circuits (ASICs), virtual machines or similar devices in conjunction with, or alternatively to the processor 114 and computer readable storage medium 116 having computer executable instructions 118 stored thereon.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
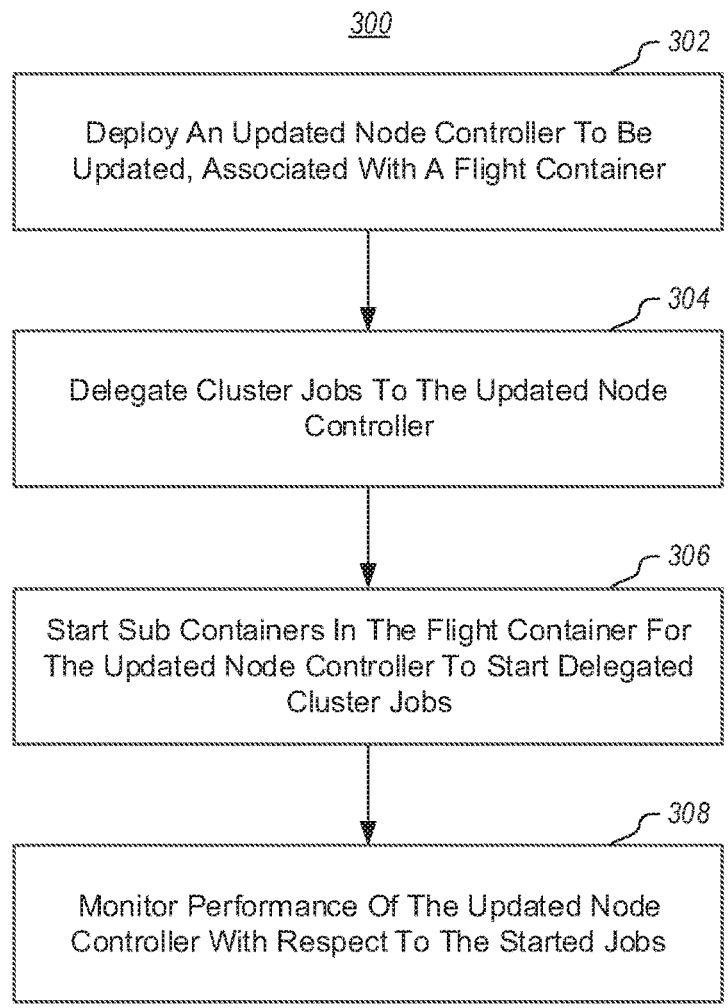
FIG. 3 illustrates a computer implemented method for deploying a new node controller.

Referring now to FIG. 3, a method 300 is illustrated. The method 300 is a computer implemented method for deploying a new node controller in a cluster environment. The method 300 includes, at a primary node controller in the cluster environment, deploying a secondary node controller to be updated associated with a flight container (act 302). The secondary node controller appears logically to the primary node controller as resources available to the primary node controller to which the primary node controller can assign cluster jobs.

The method 300 further includes, at the primary node controller, delegating cluster jobs to the secondary node controller through the flight container (act 304). For example, all or a portion of the jobs intended for the primary node controller can be delegated to the secondary node controller.

The method 300 further includes starting sub-containers in the flight container for the secondary node controller to start delegated cluster jobs (act 306). For example, sub-containers 107 can be started in the flight container 104 to run jobs for the new node controller 106.

The method 300 further includes monitoring performance of the secondary node controller with respect to the started jobs (act 308). For example, the primary node controller 100-1 may monitor the processes in the sub-containers 107 to track the performance of the secondary node controller 106.

The method 300 may further include identifying that the secondary node controller is not meeting certain targets, and as a result the primary node controller taking over delegated cluster jobs.

The method 300 may be practiced where the secondary node controller is a new version of the primary node controller. For example, the secondary node controller 106 may be an updated version of the primary node controller 100-1. In this way, a node controller can actually run an instance of a new version of itself, inside of itself:

The method 300 may be practiced where the primary node controller allocates resources to the secondary node controller as if the primary node controller is a resource manager for the secondary node controller.

The method 300 may be practiced where delegating cluster jobs to the secondary node controller is performed according to a setting specifying at least one of a number of jobs to be delegated to the secondary node controller or a percentage of jobs to be delegated to the secondary node controller.

The method 300 may be practiced where monitoring performance of the secondary node controller with respect to the started jobs includes the primary node controller requesting information from the flight container about at least one of a length of time a process has been running, an amount of resources a process has been using, a number of errors for a process, or a rate of errors for a process.

The method 300 may further include filtering certain jobs from being delegated by the primary node controller to the secondary node controller based on job characteristics. For example, the primary node controller may prevent certain 'mission critical' tasks from being delegated to the secondary node controller.

The method 300 may further include, the primary node controller generating a performance report for the secondary node controller.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable media having stored thereon instructions that are executable by the one or more processors to configure the computer system to deploy a new node controller in a cluster environment, including instructions that are executable to configure the computer system to perform at least the following:
   at a primary node controller in the cluster environment, deploy a secondary node controller to be deployed, associated with a flight container, the secondary node controller appearing logically to the primary node controller as resources available to the primary node controller to which the primary node controller can assign cluster jobs;
   at the primary node controller, delegate cluster jobs to the secondary node controller through the flight container;
   the secondary node controller starts sub-containers in the flight container for the secondary node controller to start delegated cluster jobs; and
   at the primary node controller, monitor performance of the secondary node controller with respect to the started jobs.

2. The computer system of claim 1, wherein the one or more computer-readable media further have stored thereon instructions that are executable by the one or more processors to configure the computer system to identify that the secondary node controller is not meeting certain targets, and as a result causes the primary node controller take over delegated cluster jobs.

3. The computer system of claim 1, wherein the secondary node controller is a new version of the primary node controller.

4. The computer system of claim 1, wherein the primary node controller allocates resources to the secondary node controller as if the primary node controller is a resource manager for the secondary node controller.

5. The computer system of claim 1, wherein the primary node controller delegates cluster jobs to the secondary node controller according to a setting specifying at least one of a number of jobs to be delegated to the secondary node controller or a percentage of jobs to be delegated to the secondary node controller.

6. The computer system of claim 1, wherein the primary node controller monitors performance of the secondary node controller with respect to the started jobs by requesting information from the flight container about at least one of a length of time a process has been running, an amount of resources a process has been using, a number of errors for a process, or a rate of errors for a process.

7. The computer system of claim 1, wherein the one or more computer-readable media further have stored thereon instructions that are executable by the one or more processors to configure the computer system to filter certain jobs from being delegated by the primary node controller to the secondary node controller based on job characteristics.

8. The computer system of claim 1, wherein the one or more computer-readable media further have stored thereon instructions that are executable by the one or more processors to configure the computer system to cause the primary node controller to generate a performance report for the secondary node controller.

9. The computer system of claim 1, wherein the one or more computer-readable media further have stored thereon instructions that are executable by the one or more processors to configure the computer system to:
    temporarily shut down the secondary node controller, while allowing the flight container and sub-containers to continue to run;
    change the configuration of the secondary node controller;
    restart the secondary node controller; and
    associate the secondary node controller with the flight container and sub-containers.

10. A computer implemented method for updating a new node controller in a cluster environment, the method comprising:
    at a primary node controller in the cluster environment, deploying a secondary node controller to be updated, associated with a flight container, the secondary node controller appearing logically to the primary node controller as resources available to the primary node controller to which the primary node controller can assign cluster jobs;
    at the primary node controller, delegating cluster jobs to the secondary node controller through the flight container;
    the secondary node controller starting sub-containers in the flight container for the secondary node controller to start delegated cluster jobs; and
    at the primary node controller, monitoring performance of the secondary node controller with respect to the started jobs.

11. The method of claim 10, further comprising identifying that the secondary node controller is not meeting certain targets, and as a result causing the primary node controller to take over delegated cluster jobs.

12. The method of claim 10, wherein the secondary node controller is a new version of the primary node controller.

13. The method of claim 10, wherein the primary node controller allocates resources to the secondary node controller as if the primary node controller is a resource manager for the secondary node controller.

14. The method of claim 10, wherein delegating cluster jobs to the secondary node controller is performed according to a setting specifying at least one of a number of jobs to be delegated to the secondary node controller or a percentage of jobs to be delegated to the secondary node controller.

15. The method of claim 10, wherein monitoring performance of the secondary node controller with respect to the started jobs comprises the primary node controller requesting information from the flight container about at least one of a length of time a process has been running, an amount of resources a process has been using, a number of errors for a process, or a rate of errors for a process.

16. The method of claim 10, further comprising filtering certain jobs from being delegated by the primary node controller to the secondary node controller based on job characteristics.

17. The method of claim 10, further comprising, the primary node controller generating a performance report for the secondary node controller.

18. A system comprising:
    one or more processors;
    computer readable storage media coupled to the one or more processors comprising computer executable instructions that are executable by the one or more processors to configure the one or more processors to instantiate a flight container in a primary node controller, wherein the flight container comprises:
        one or more resource APIs used to allocate system resources to the flight container;
        one or more updated controller APIs used to deploy a secondary node controller, associated with the flight container, such that the secondary node controller appears logically to the primary node controller as resources available to the primary node controller to which the primary node controller can assign computing cluster jobs; and
        one or more control APIs used by the node controller to control secondary node controllers deployed in the flight container.

19. The system of claim 18, wherein instantiating a flight container comprises instantiating a container command proxy that directs command and resource requests between the secondary node controller and the primary node controller using the one or more control APIs.

20. The system of claim 18, wherein the primary node controller comprises a filter that filters jobs from being delegated by the primary node controller to the secondary node controller based on job characteristics.

21. The system of claim 18, wherein the primary node controller allocates resources to the secondary node controller as if the primary node controller is a resource manager for the secondary node controller.

22. A node controller comprising:
    means for allocating system resources to a flight container associated with the node controller;
    means for deploying a secondary node controller associated with the flight container such that the secondary node controller appears logically to the node controller as resources available to the node controller to which the node controller can assign computing cluster jobs; and means for controlling secondary node controllers deployed associated with the flight container.

23. The node controller of claim 21, further comprising means for directing command and resource requests between the secondary node controller and the primary node controller.

24. The node controller of claim 21, further comprising means for filtering jobs from being delegated by the primary node controller to the secondary node controller based on job characteristics.

* * * * *